(12) United States Patent
Bernard et al.

(10) Patent No.: US 12,255,362 B2
(45) Date of Patent: Mar. 18, 2025

(54) SOLID OXIDE ELECTROCHEMICAL SYSTEM HAVING INTEGRATED HEATING MEANS

(71) Applicant: COMMISSARIAT A L'ENERGIE ATOMIQUE ET AUX ENERGIES ALTERNATIVES, Paris (FR)

(72) Inventors: Charlotte Bernard, Grenoble (FR); André Chatroux, Grenoble (FR); Guilhem Roux, Grenoble (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 243 days.

(21) Appl. No.: 17/287,841

(22) PCT Filed: Oct. 23, 2019

(86) PCT No.: PCT/FR2019/052534
§ 371 (c)(1),
(2) Date: Apr. 22, 2021

(87) PCT Pub. No.: WO2020/084258
PCT Pub. Date: Apr. 30, 2020

(65) Prior Publication Data
US 2021/0391585 A1    Dec. 16, 2021

(30) Foreign Application Priority Data

Oct. 26, 2018    (FR) ........................................ 1859930

(51) Int. Cl.
*H01M 8/04007*    (2016.01)
*C25B 1/04*    (2021.01)
(Continued)

(52) U.S. Cl.
CPC ............ *H01M 8/04037* (2013.01); *C25B 1/04* (2013.01); *C25B 9/73* (2021.01); *C25B 15/021* (2021.01);
(Continued)

(58) Field of Classification Search
CPC ........... H01M 8/04037; H01M 8/2432; H01M 8/0267; H01M 8/04365; H01M 8/12; H01M 8/248
See application file for complete search history.

(56) References Cited

U.S. PATENT DOCUMENTS 3,266,307 A * 8/1966 De Winter ............. G01K 17/04
374/E17.006
5,763,114 A * 6/1998 Khandkar .............. B01J 8/0085
429/513
(Continued)

FOREIGN PATENT DOCUMENTS

CH    713 019 A2    4/2018
FR    3 045 215 A1    6/2017
(Continued)

OTHER PUBLICATIONS

Machine Translation of WO-2021099036-A1 (Apr. 13, 2023) (Year: 2023).*
(Continued)

*Primary Examiner* — Matthew J Merkling
(74) *Attorney, Agent, or Firm* — Oblon, McClelland, Maier & Neustadt, L.L.P.

(57) ABSTRACT

An electrochemical system includes an electrochemical device having a stack of n solid oxide electrochemical cells, n being an integer greater than or equal to 1. The electrochemical system also includes at least n−1 interconnection plates which are interposed between the electrochemical cells, and means for supplying gas to the electrochemical
(Continued)

cells and means for collecting gas produced by the electrochemical cells. The electrochemical system further includes means for electrically connecting the system to the outside. The electrochemical device also includes heating means integrated into the stack, said heating means comprising electrical conductors housed in the clamping plates.

17 Claims, 6 Drawing Sheets

(51) Int. Cl.
    *C25B 9/73*     (2021.01)
    *C25B 15/021*     (2021.01)
    *H01M 8/0267*     (2016.01)
    *H01M 8/0432*     (2016.01)
    *H01M 8/12*     (2016.01)
    *H01M 8/2432*     (2016.01)
    *H01M 8/2475*     (2016.01)
    *H01M 8/248*     (2016.01)

(52) U.S. Cl.
    CPC ..... *H01M 8/0267* (2013.01); *H01M 8/04365* (2013.01); *H01M 8/12* (2013.01); *H01M 8/2432* (2016.02); *H01M 8/2475* (2013.01); *H01M 8/248* (2013.01); *H01M 2008/1293* (2013.01)

(56) References Cited

U.S. PATENT DOCUMENTS

| | | | | |
|---|---|---|---|---|
| 6,649,293 | B1* | 11/2003 | Jones | H01M 8/241 |
| | | | | 429/492 |
| 9,755,263 | B2* | 9/2017 | Trevisan | H01M 8/04313 |
| 10,892,511 | B2 | 1/2021 | Reytier et al. | |
| 2004/0053092 | A1* | 3/2004 | Kato | H01M 8/04179 |
| | | | | 429/429 |
| 2005/0058865 | A1* | 3/2005 | Thompson | H01M 8/04268 |
| | | | | 429/432 |
| 2009/0087704 | A1 | 4/2009 | Miyamoto | |
| 2014/0030632 | A1* | 1/2014 | Larsen | H01M 8/021 |
| | | | | 429/535 |
| 2016/0013501 | A1 | 1/2016 | Hirakawa et al. | |
| 2019/0226101 | A1 | 7/2019 | Junaedi et al. | |
| 2019/0229352 | A1 | 7/2019 | Junaedi et al. | |
| 2020/0020962 | A1 | 1/2020 | Junaedi et al. | |

FOREIGN PATENT DOCUMENTS

| | | | |
|---|---|---|---|
| WO | WO 2017/102657 A1 | 6/2017 | |
| WO | WO 2018/080571 A1 | 5/2018 | |
| WO | WO-2021099036 A1 * | 5/2021 | ........ H01M 8/04037 |

OTHER PUBLICATIONS

International Search Report issued on Apr. 17, 2020 in PCT/FR2019/052534 filed on Oct. 23, 2019, 3 pages.
French Preliminary Search Report (with English translation of Categories of Cited Documents) issued on Jul. 9, 2019 in French Application 1859930 filed on Oct. 26, 2018, 2 pages.
U.S. Appl. No. 16/333,299, filed Mar. 14, 2019, US 2019/0245224 A1, Vincent Lacroix, et al.
U.S. Appl. No. 16/341,956, filed Apr. 15, 2019, US 2019/0242001 A1, Benjamin Bernard et al.
U.S. Appl. No. 16/473,809, filed Jun. 26, 2019, US 2019/0326621 A1, Michel Planque, et al.
U.S. Appl. No. 16/475,836, filed Jul. 3, 2019, US 2019/0372137 A1, Michel Planque, et al.
U.S. Appl. No. 16/723,394, filed Dec. 20, 2019, US 2020/0211989 A1, Jeannet Bernard.
U.S. Appl. No. 16/728,188, filed Dec. 27, 2019, US 2020/0208841 A1, Christophe Chabaille, et al.
U.S. Appl. No. 16/769,876, filed Jun. 4, 2020, Michel Planque, et al.
U.S. Appl. No. 16/758,176, filed Apr. 22, 2020, US 2020/0313217 A1, Michel Planque, et al.
U.S. Appl. No. 16/872,469, filed May 12, 2020, US 2020/0360993 A1, Mathieu Opprecht, et al.
U.S. Appl. No. 16/954,888, filed Jun. 17, 2020, US 2020/0403261 A1, Charlotte Bernard, et al.
U.S. Appl. No. 16/975,593, filed Aug. 25, 2020, US 2020/0391600 A1, Bruno Beranger, et al.
U.S. Appl. No. 17/254,080, filed Dec. 18, 2020, Patrick Bulot, et al.

\* cited by examiner

SOLID OXIDE ELECTROCHEMICAL SYSTEM HAVING INTEGRATED HEATING MEANS

TECHNICAL FIELD AND STATE OF PRIOR ART

The present invention is concerned with an electrochemical system including solid oxide electrochemical cells operating at high temperature.

The system can be implemented for high temperature electrolysis and include a stack of solid oxide electrolyser cells or SOECs or as a fuel cell and include a stack of solid oxide fuel cells or SOFCs.

Such a system includes a stack of electrochemical cells sandwiched between two clamping plates.

Each cell includes an electrolyte between two electrodes. Interconnect plates are interposed between the cells and provide electrical connection between the cells. Further, the interconnect plates provide gas supply to the cells and collection of the gases produced at each cell.

In operation, the anode and cathode are the location for electrochemical reactions, while the electrolyte allows transport of ions from the cathode to the anode, or vice versa, depending on whether the electrochemical device is operating in electrolyser mode or fuel cell mode.

Thus, in electrolyser mode, the cathode compartment allows a feed of water vapour and discharge of water reduction products, especially hydrogen, while the anode compartment ensures, via a draining gas, discharge of the dioxygen produced by the oxidation of $O^{2-}$ ions migrating from the cathode to the anode.

The mechanism of electrolysis (SOEC mode) of water vapour by a unit electrochemical cell is described below. During this electrolysis, the unit electrochemical cell is supplied with a current flowing from the cathode to the anode. The water vapour dispensed from the cathode compartment is then reduced under the effect of the current according to the following half-reaction:

$$2H_2O+4e^- \rightarrow 2H_2+2O^{2-}.$$

Dihydrogen produced during this reaction is then discharged, while the $O^{2-}$ ions produced during this reduction migrate from the cathode to the anode, via the electrolyte, where they are oxidised into dioxygen according to the half-reaction:

$$2O^{2-} \rightarrow O_2+4e^-.$$

The dioxygen thus formed is discharged by the draining gas flowing in the anode compartment.

The electrolysis of water vapour is based on the following reaction:

$$2H_2O \rightarrow 2H_2+O_2.$$

In fuel cell mode ("SOFC"), air is injected into the cathode compartment, which dissociates into $O^{2-}$ ions. These ions migrate to the anode and react with dihydrogen flowing in the anode compartment to form water.

Operation in fuel cell mode allows the production of an electric current.

The clamping plates exert a clamping force on the stack to ensure good electrical contact between the interconnect plates and the cells, and sealing of the stack.

Operating temperatures of SOEC/SOFC systems are generally between 600° C. and 1000° C. These temperatures are achieved by placing the stack in a high power oven. The oven includes an enclosure and, for example, electrical resistors on the internal faces of the enclosure walls. It has therefore a certain overall size. Heat transfer between the electrical resistors and the stack is made by convection and radiation. Instrumentation is provided in the space delimited between the oven and the device to monitor and regulate the temperature.

The hydrogen production or electric power generation system thus includes an oven and the electrochemical device. The system is of relatively large overall size and difficult to handle.

Furthermore, a gas flush is carried out in the oven for safety reasons, which disturbs convection transfer. Additionally, heat transfer by radiation is dependent on the dimensions of the enclosure, the larger the enclosure the more the heat transfer by radiation is impacted.

Document WO2017102657 describes an example of an electrochemical device including a stack of solid oxide cells held together by a "plug and play" type clamping system, that is easily connectable to the gas supply and collection circuits. The clamping system is designed to ensure a substantially constant clamping level despite temperature variations. The electrochemical device is disposed in an oven.

DISCLOSURE OF THE INVENTION

It is therefore a purpose of the present invention to provide an electrochemical system comprising solid oxide electrochemical cells operating at high temperature without the drawbacks of systems of the state of the art.

The purpose set out above is achieved by a system including an electrochemical device comprising a stack of solid oxide electrochemical cells and interconnect plates interposed between the cells, and heating means integrated into the stack, said heating means including electrical conductors. For example, the electrical conductors inputting thermal energy to the device are disposed in or in contact with the clamping plate.

As the electrochemical system no longer requires the implementation of an oven, its overall size is thereby reduced. Further, it is easier to transport and use. In addition, the instrumentation to control the temperature can be integrated into the stack, which further simplifies the system.

Further, by integrating the heating means into the electrochemical device, heating directly takes place by conduction through dense materials, the drawbacks associated with heat transfer between the walls of the oven enclosure and the stack no longer arise.

In addition, such heating means have an increased responsivity to the temperature set point being set for the device.

In a very advantageous example, the electrochemical system includes a thermally insulating enclosure defining a thermally insulated space receiving the electrochemical device.

Thus thermal leakage is substantially reduced and heating of the device is made even more uniform, and a very good thermal homogeneity of the stack between the upper and lower plates, and thus a very good overall thermal homogeneity of the stack are obtained.

Furthermore, due to the reduction in heat loss resulting from the presence of the enclosure, the set point given to the heating means is close to the heating objective of the stack, and the power to be provided to the device is reduced.

The thermally insulating enclosure is advantageously shaped to be as close as possible to the external surface of the stack, which allows radiation losses to be further limited.

One subject-matter of the present invention is thereby an electrochemical system including at least one electrochemical device comprising a stack of n solid oxide electrochemical cells, n being an integer greater than or equal to 1, and at least n−1 interconnect plates interposed between the electrochemical cells, means for supplying gas to the electrochemical cells and means for collecting gases produced by the electrochemical cells, and means for electrically connecting the system to the exterior. The electrochemical device also includes heating means integrated into the stack, said heating means being with Joule effect.

The n electrochemical cells include a transverse cross-sectional area S taken in a direction perpendicular to the direction of the stack. Preferably, the heating means define a heating surface area at least equal to the transverse cross-sectional area S of the electrochemical cells.

Preferably, the heating means are inserted into at least one plate, called a heating plate, disposed in or on the stack.

In one exemplary embodiment, the heating means include at least one electrical conductor housed in the at least one heating plate.

For example, at least one heating plate includes a recess formed in a larger surface area face in which the electrical conductor is housed and in which it is kept stationary, for example by means of a solder. As a variant, the electrical conductor is forced into a machined groove.

In another exemplary embodiment, the heating means include at least one electrical heating element mounted in a bore of said heating plate, advantageously in a side edge of said heating plate.

The at least one heating plate can be disposed at an end of the stack in the direction of the stack through which the gas supply means passes.

In one advantageous example, the at least one heating plate includes temperature measuring means. The temperature measuring means can include a sensor configured to measure temperatures of the electrical conductor or the electrical heating element, and a sensor configured to measure temperature of the heating plate.

The electrochemical system can advantageously include two clamping plates each disposed at one end of the stack in the direction of the stack and means cooperating with the plates to apply a clamping force to the n cells and n−1 interconnects.

According to an additional feature, the heating means are inserted into at least two heating plates.

In one exemplary embodiment, at least one heating plate can advantageously be formed by a clamping plate.

The integration of the heating means into one or more clamping plates allows for simple adaptation of existing devices.

In another exemplary embodiment, the at least one heating plate is a spacer plate mounted in two cells.

In another exemplary embodiment, the at least one heating plate bears against a clamping plate, advantageously against its external face.

The electrochemical system can advantageously include a thermally insulating enclosure defining an internal space receiving the electrochemical device and thermally insulating it from the exterior. For example, the enclosure comprises a hearth, a side wall and an upper wall. The electrical connection means, gas supply means and gas collection means can pass through the hearth.

BRIEF DESCRIPTION OF THE DRAWINGS

The present invention will be better understood based on the following description and the appended drawings in which.

DETAILED DISCLOSURE OF PARTICULAR EMBODIMENTS

Figure 1:
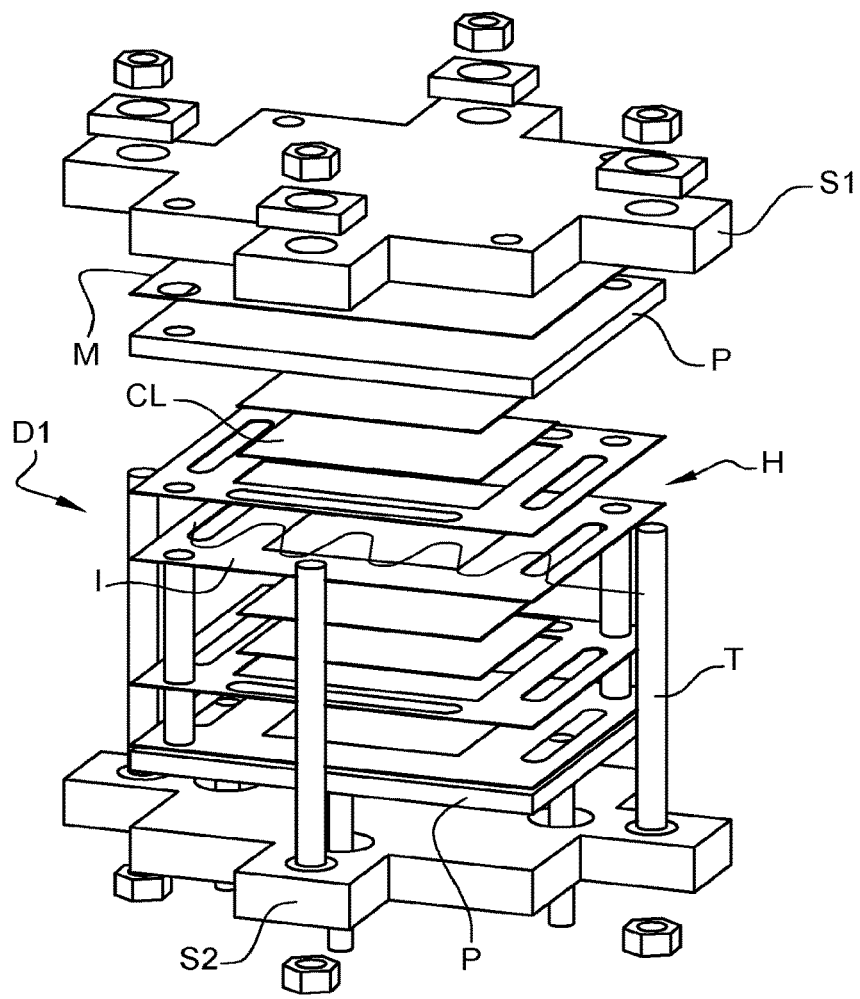
FIG. 1 is an exploded view of an electrochemical system illustrating the principle of the invention.

In FIG. 1, an exploded view of an exemplary embodiment of an electrochemical system according to the invention can be seen.

The electrochemical system includes an electrochemical device D1 to be implemented for high temperature electrolysis ("SOEC" mode) or as a fuel cell ("SOFC" mode).

The electrochemical device D1 comprises a stack of solid oxide electrochemical cells.

The stack comprises a plurality of unit electrochemical cells CL each formed by a cathode, an anode and an electrolyte disposed between the anode and the cathode. The electrolyte is of a solid, dense ion-conducting material, and the anode and cathode are porous layers.

The stack further includes interconnect plates or interconnectors I, each interposed between two successive unit cells and providing electrical connection between an anode of one unit cell and a cathode of the adjacent unit cell. The interconnectors I provide a series connection of unit cells.

A stack can include between one cell and several hundred cells, preferably between 25 and 75 cells.

The intermediate interconnectors also delimit fluidic compartments at the surface of the electrodes with which they are in contact.

The face of an intermediate interconnector I in contact with an anode of a unit electrochemical cell CL delimits a compartment, called the anode compartment, and the face of an interconnector I in contact with a cathode of a unit electrochemical cell CL delimits a compartment, called the cathode compartment.

Each of the anode and cathode compartments allows dispense and collection of said gases.

For example, for water electrolysis, the cathodic compartment ensures water vapour supply to the cathode and discharge of the hydrogen produced. The anode compartment ensures flow of a draining gas and discharge of the oxygen produced at the anode.

The electrochemical device can include end plates P disposed on either side of the stack. The end plates are electrically conductive.

The device also includes tubes (not represented) for dispensing gases and tubes for collecting gases.

In the example represented, the electrochemical device D1 also comprises a clamping system S1, S2 provided with two clamping plates, called the first clamping plate or upper clamping plate S1 and the second clamping plate or lower clamping plate S2 respectively, which are disposed on either side of the stack in the direction of the stack and for exerting a clamping force on the stack by means of tie rods T.

According to this configuration, each end plate P is electrically insulated from the clamping plate adjacent thereto, by interposing an electrically insulating plate M, for example of mica, between each clamping plate and each end plate.

The tie rods T are, for example, formed by clamping rods passing through the clamping plates and on the ends of which nuts are mounted. These means are, in this respect, described in document FR 3 045 215.

Advantageously, the clamping plates S1, S2 can be made of stainless steel, very advantageously of refractory austenitic steel, for example of the AISI 310S type, having a coefficient of thermal expansion equal to $18.5 \cdot 10^{-6}$ between 20° C. and 800° C. Further, this steel offers good mechanical strength up to 1000° C. The tie rods are, for example, of a nickel-based superalloy of the Inconel 625 type.

The combination of these materials makes it possible to compensate for the difference in expansion between clamping rods and electrochemical cells due to the significant expansion of the clamping plates. Advantageously, washers, of the same material as the clamping plates, are interposed between the clamping plates and the nuts.

One and/or both of the clamping plates S1, S2 is/are provided with at least one gas flow duct which allows gas flow from a gas inlet to a gas outlet in order to supply gas to or discharge gas from the solid oxide stack. The gas inlet and outlet are disposed on both larger surface area faces of the clamping plate S1, S2, respectively.

The electrochemical device also includes heating means H integrated into the stack. In FIG. 1, these means H are schematically represented.

Herein, by "integrated heating means" it is meant heating means in direct mechanical contact with the stack. They are disposed on and/or in the stack. The heating means are mounted in already existing stack elements or in elements added to the stack.

Figure 2:
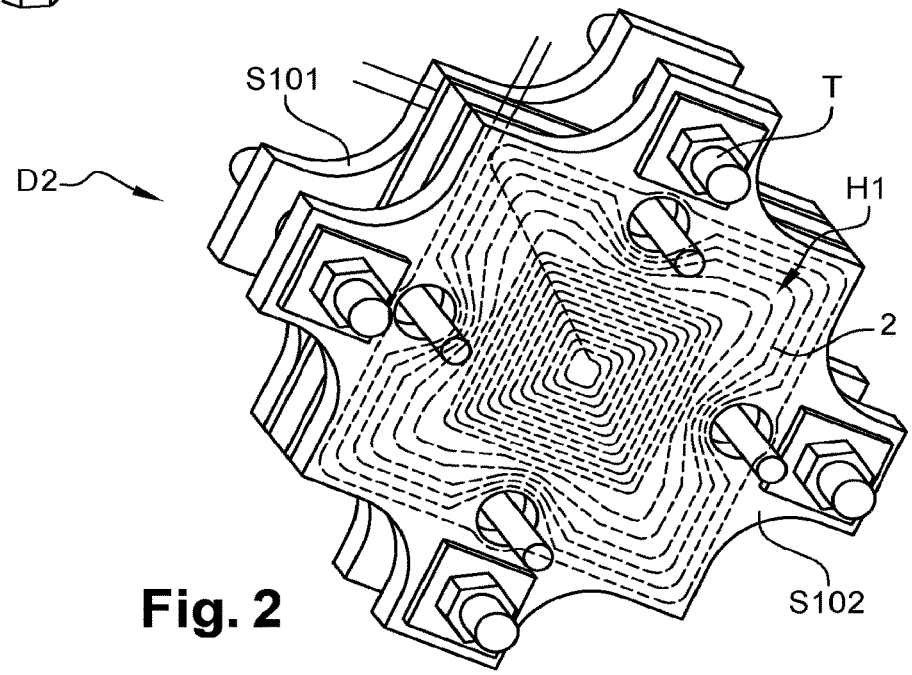
FIG. 2 is a perspective view of an electrochemical system according to one exemplary embodiment.
Figure 3A:
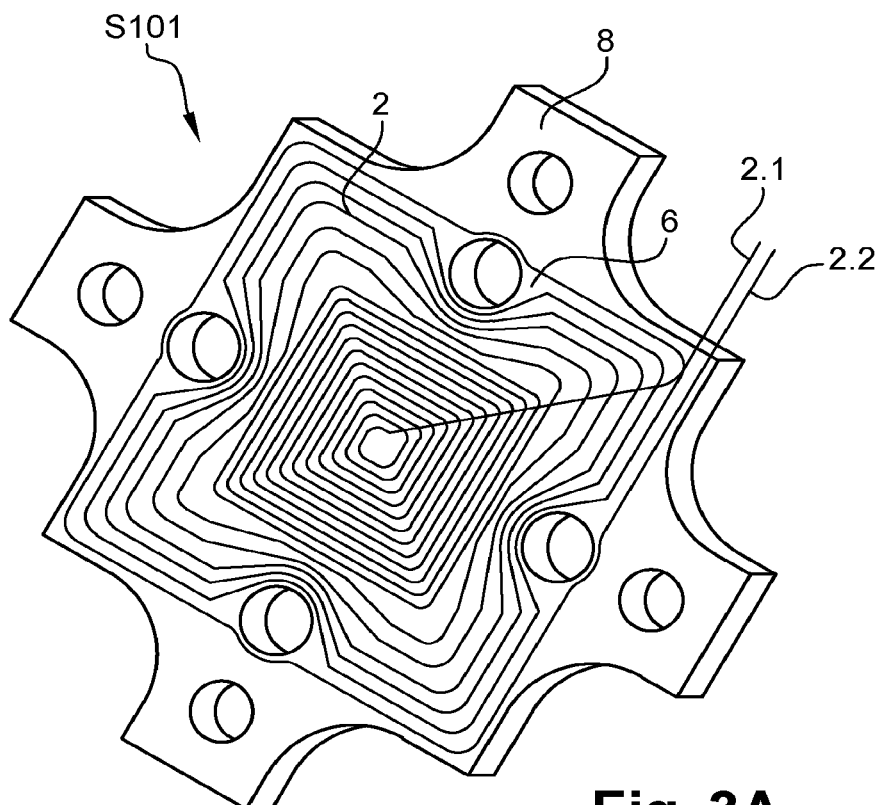
FIG. 3A is a perspective view of a clamping plate implemented in the system of FIG. 2, represented alone.
Figure 3B:
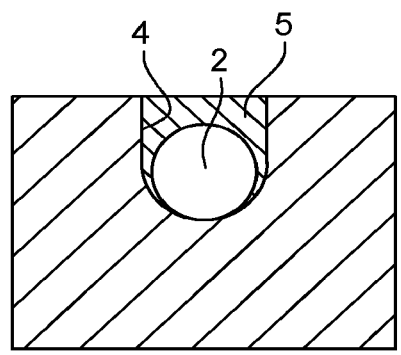
FIG. 3B is a detail view of a cross-section of the clamping plate of FIG. 3A at an electrical conductor.

The heating means H1 are electrical Joule heating means. They include one or more electrically conductive cables or cords 2 integrated into the stack and which generate heat by dissipation. In the following of the description, "cable", "electrical cable", "heating cable" or "electrical conductors" will be used to designate electrical conductor cables forming the heating means. For example, the heating cables comprise a heating core with a mineral insulator, magnesia MgO (96-99%), under an Inconel 600 sheath and integrated cold terminations. The heating core has for example a diameter of 2.0 mm+/−0.05 mm over a length of 6.5 m+/−5%, having an internal resistance of 7.0 ohms/m+/−10%. In FIGS. 2, 3A and 3B, one exemplary embodiment of a practical electrochemical device D2 can be seen. In this example, the heating means H1 are disposed in the thickness of one or both clamping plates S101, S102. Advantageously, they are disposed in both clamping plates in order to ensure homogeneous heating of the stack.

The clamping plates are made of a material which is able to conduct heat to the stack. Preferably the material has a good thermal conductivity, preferably at least equal to 10 W/m·K. AISI 310S steel advantageously has a good thermal conductivity, 15 W/m·K at 20° C. and 19 W/m·K at 500° C.

In this example and as is represented in FIG. 3B, a recess 4 is formed in one of the larger surface area faces of a clamping plate S101, the depth of which is sufficient to receive the electrical cable 2. Preferably, the depth of the recess 4 is sufficient to ensure that the cable 2 does not protrude from the plate. The cable is kept stationary in the recess 4 by the addition of a material for example solder 5, for example made under vacuum. Preferably, the material of the solder is the same as that of the clamping plate in order to avoid differential expansion risks.

Preferably, the solder is disposed on the stacking side. Thus, the heating zone is located as close as possible to the stack.

As a variant, the cable is forced into a machined groove in the plate.

In this example the conductor is disposed in the form of a square spiral.

Very advantageously, the electrical cable is distributed over a surface area corresponding to the surface area of the electrochemical cells in order to optimise heating of the device. In the example represented, the clamping plate S101 includes a square-shaped main part 6 and branches 8 protruding from each side of the main part for passing the tie rods therethrough. The electrical cable extends over the entire surface of the main part almost to the edges of the main part. In this example, the electric cable is evenly distributed over the surface, ensuring that the heating is evenly distributed over the entire surface of the stack.

The connection ends 2.1, 2.2 of the cable laterally emerge from the clamping plate to be electrically connected to the rest of the system.

The implementation of Joule type heating means has the advantage of allowing easy control of the thermal energy generated. Their integration as close as possible to the cells makes it possible to control the energy that is actually input to the stack. Moreover, their overall size is reduced. Further, the integration of the cable(s) in the clamping plates makes it possible not to modify the overall size of the electrochemical device and therefore allows it to replace devices already in place.

Further, the electrical heating means allow temperatures higher than the operating temperature of the stack to be reached. Thereby, this gives greater freedom in the arrangement of the device in its environment.

Figure 4A:
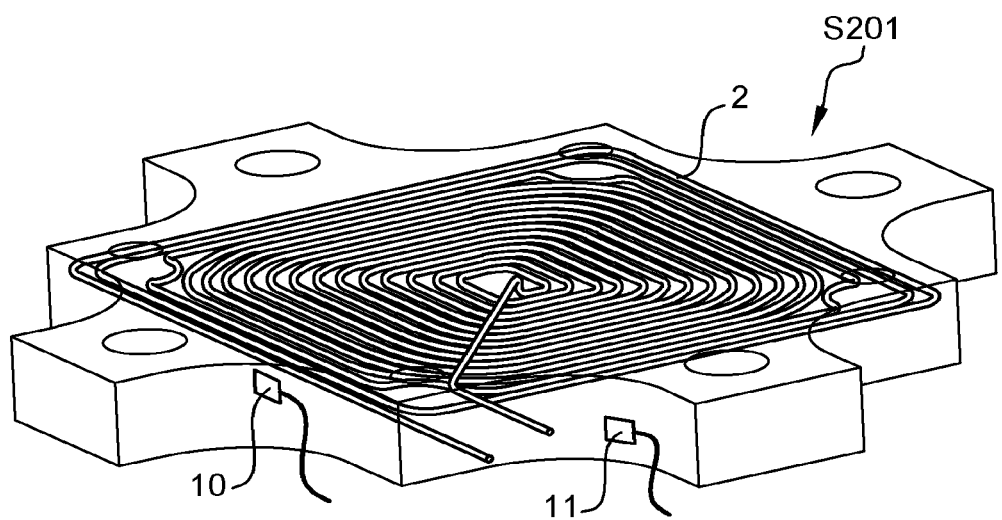
FIGS. 4A and 4B are perspective views of a clamping plate according to a variant that can be implemented in the system of FIG. 2.
Figure 4B:
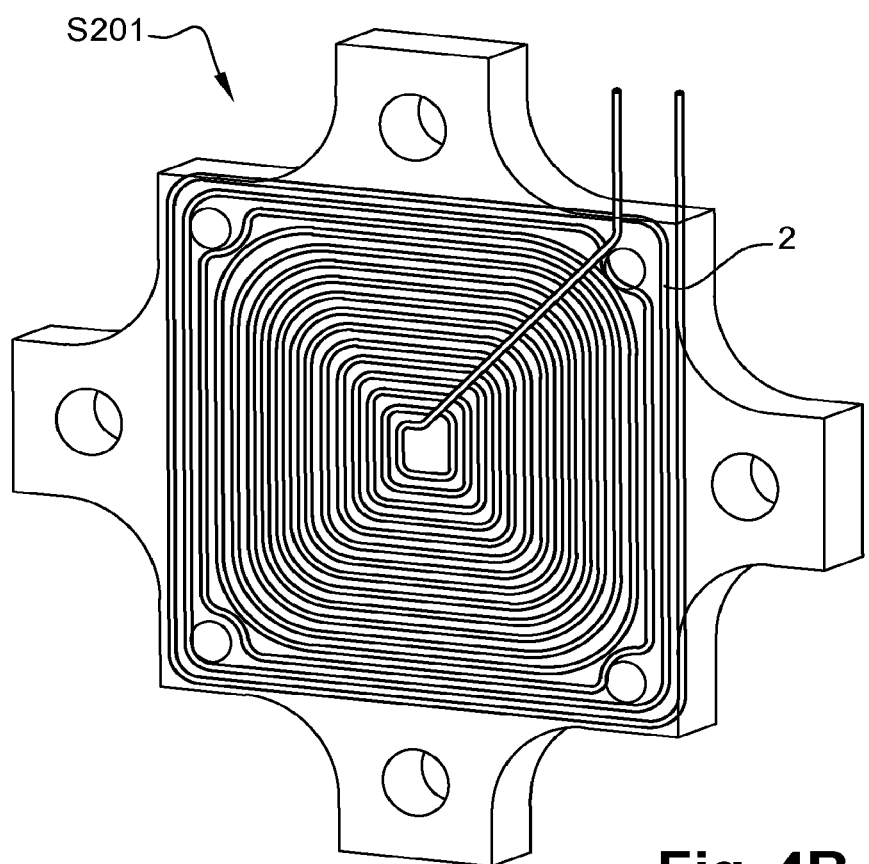

In FIGS. 4A and 4B, a variant of a clamping plate S201, in which the electric cable 2 has a different distribution can be seen.

Any other distribution of the electric cable is contemplatable.

In endothermic operation, a significant heat loss occurs at the heart of the stack. Preferably, the plate has a high density of electrical conductor in the centre of the plate to provide a higher heat quantity in the centre of the plate relative to the edges of the plate.

The recess is for example made by machining.

By way of example, the clamping plates have in-plane dimensions of for example a few hundred mm, for example 200 mm×200 mm, and a thickness of one to several tens of mm, for example 10 mm.

In the examples represented, only one electrical cable per plate is implemented, which simplifies connection to the power source. However, it can be contemplated to put several cables per plate distributed in one or more planes. The implementation of several cables has the advantage, in the event of a cable failure, of allowing heat to be still provided to the stack, especially as it is not generally possible to remove the clamping plates, as the load applied by them via the tie rods cannot be cancelled without making the device inoperative.

Advantageously, one or more temperature sensors 10, 11, for example thermocouples represented in FIG. 4A, are disposed in each clamping plate. Preferably two temperature sensors are used, a safety temperature sensor 10 disposed as close as possible to the heating cable in order to control the temperature of the cable and to avoid overheating and degradation thereof, and a temperature sensor 11 for regulation and disposed so as to measure the temperature of the plate, the regulation sensor is disposed further away from the heating cable, for example a few millimetres away.

Figure 5:
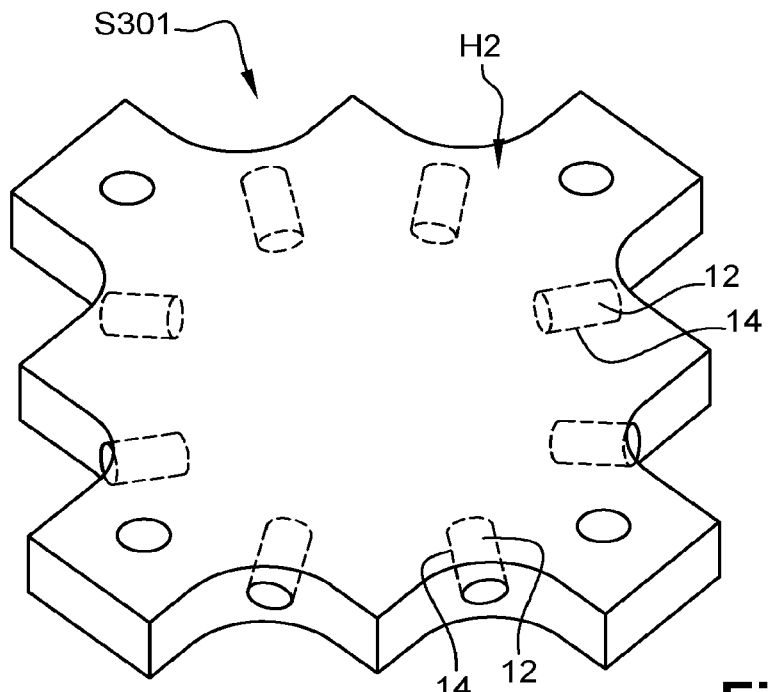
FIG. 5 is a perspective view of a clamping plate according to another exemplary embodiment that can be implemented in the system of FIG. 2.

In FIG. 5, another exemplary embodiment of a clamping plate S301 represented schematically with heating means H2 can be seen. The heating means $H_2$ comprise electrically conductive elements in the form of fingers or pins 12, which are laterally inserted into the clamping plates as shown. The plates include recesses 14 in their side edges, for example blind bores, in which heat-dissipating electrically conductive elements are mounted. Preferably, the pins or fingers are evenly distributed throughout the periphery of the plates. Preferably, the fingers are force-fitted into the recesses 14 in order to ensure good thermal contact between the fingers and the plate and to reduce heat losses. As a variant, in particular in the upper clamping plate, it can be contemplated to dispose at least part of the fingers perpendicular to the mean plane of the clamping plate.

The integration of the heating means into one or more clamping plates allows existing devices to be adapted in a simple manner.

The mean plane of the clamping plate is the plane to which the larger surface area faces of the clamping plate are substantially parallel.

Figure 6:
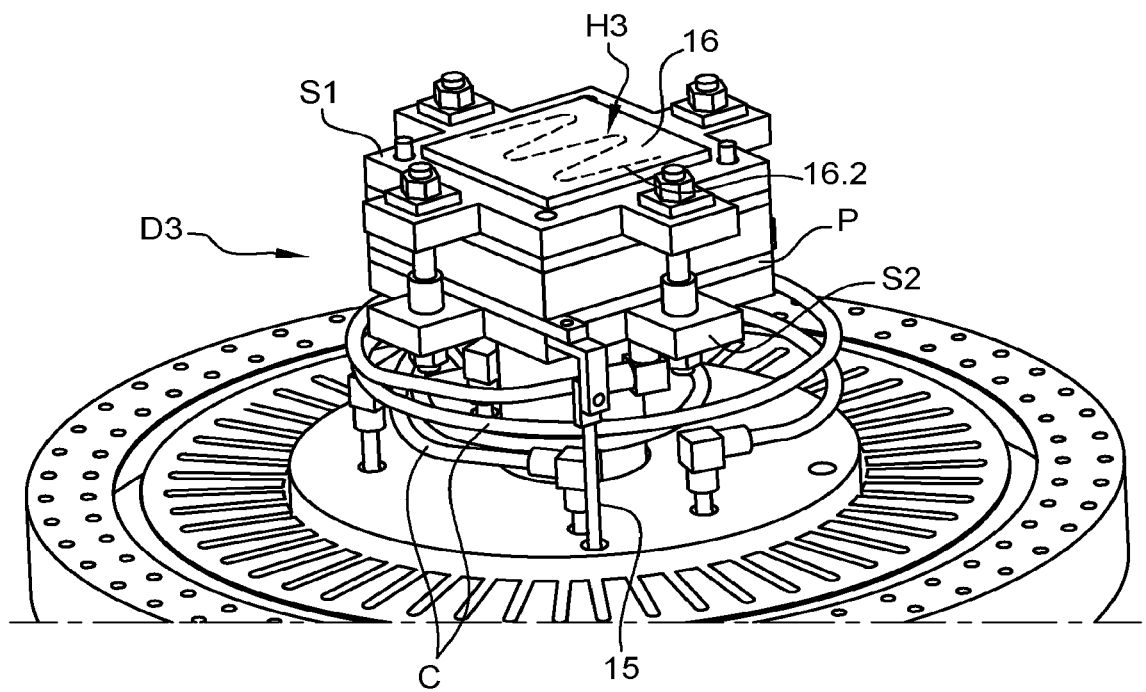
FIG. 6 is a perspective view of an electrochemical system according to another exemplary embodiment, in which the heating means are attached to the clamping plates on the exterior.
Figure 7A:
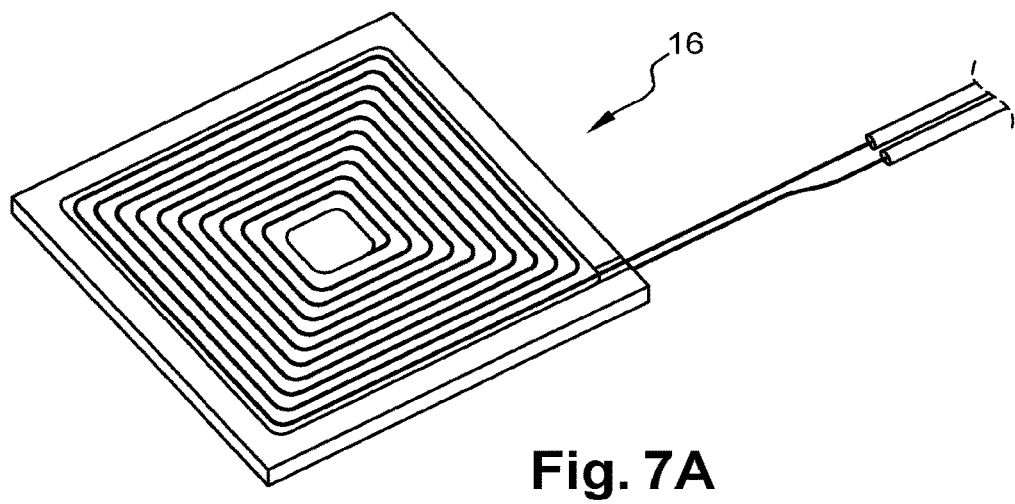
FIGS. 7A to 7C are different schematic representations of the heating means of the system of FIG. 6.

In FIG. 6, another exemplary embodiment of an electrochemical device D3 can be seen, in which the heating means H3 are attached to the clamping plates to the exterior thereof. The heating means include at least one heating plate 16 represented in FIGS. 7A to 7C.

Figures 7B, 7C:
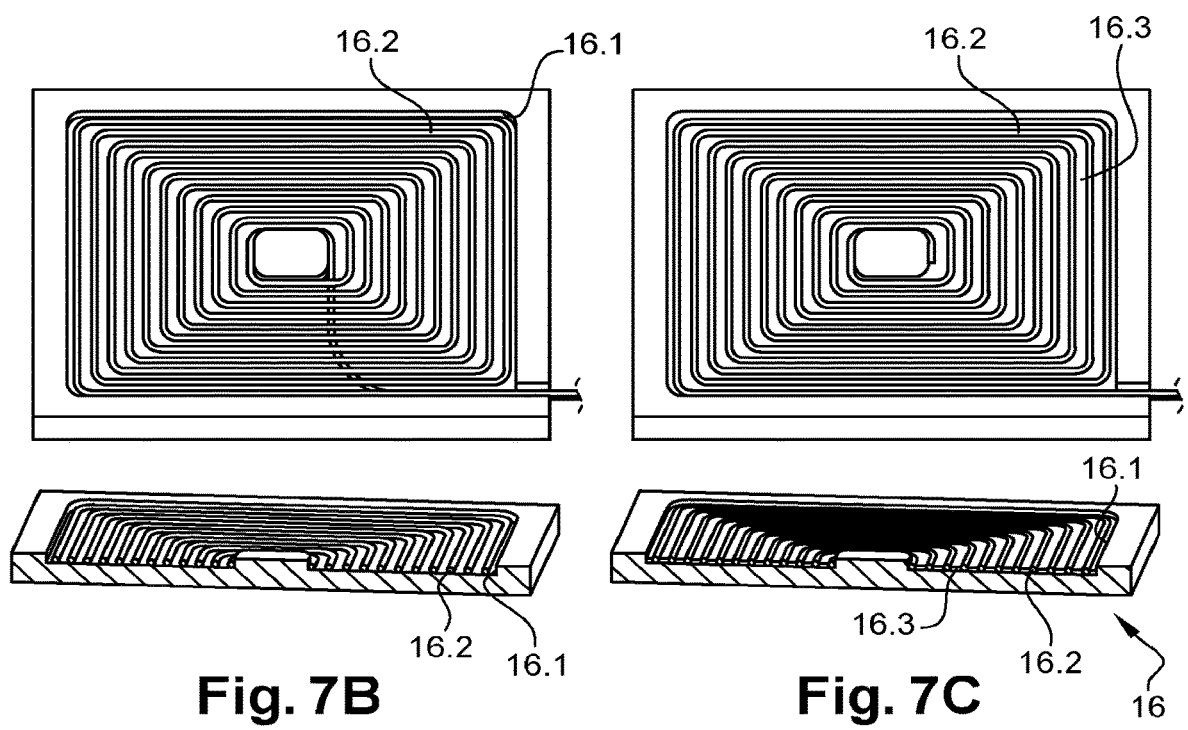

The heating plate 16 is, for example, manufactured by the same method as the clamping plates in FIGS. 2, 3A and 3B. The heating plate 16 includes a recess 16.1 formed in one of its main larger surface area faces and an electrical cable 16.2 represented in dotted lines disposed in the recess 16.1 and a solder 16.3 is deposited into the recess 16.1 on the cable in order to keep the cable stationary in the recess. In FIG. 7B, the solder is not yet deposited.

The plate 16 thus formed can then be mounted in direct contact against the external face of a clamping plate S1. Preferably, in order to ensure a very good heat transfer between the heating plate 16 and the clamping plate S2, the contacting faces have a very good flatness. For example, the heating plate is brought into contact with the clamping plate so that it can be easily removed, that is without being permanently fastened thereto, while benefiting from the heating means integrated into the stack. As a variant, a layer of ductile material offering good thermal conductivity, for example gold paste, is interposed between the clamping plate and the heating plate, thereby improving thermal contact between the heating plate and clamping plate, and compensating for flatness defects.

As a variant, the heating plate can have heating fingers or pins as in the example represented in FIG. 5. The fingers or pins can be mounted in the side edges and/or through the main external face of the heating plate.

The implementation of one or more heating plates 16 attached to the clamping plates allows already manufactured electrochemical devices to be fitted and for which removal of the clamping plates, either to replace them with integrated-heating clamping plates, or to introduce spacer heating plates is not possible.

In FIG. 6, the gas supply and gas collection ducts C and the cable 15 for electrical connection to an end plate T can be seen.

As a variant, the heating means can be integrated into the stack as a plate added into the stack. For example, the heating means include one or more spacer plates into which a heating cable is integrated. This plate or these plates is or are disposed between a clamping plate and an end plate. Preferably two spacer plates are provided, one between the upper clamping plate and the upper end plate, and the other between the lower clamping plate and the lower end plate.

According to another variant, the spacer plate(s) are each disposed between two unit electrochemical cells. The insertion of heating spacer plates allows reduction of vertical thermal gradients within the stack. In this variant, either the spacer plates replace interconnectors or external electrical connection means make it possible to provide electrical connection between the cells.

One or more safety and/or regulation temperature sensors can advantageously be disposed in the heating plates.

Thermocouples are advantageously disposed in the heating plate(s) 16 or in the spacer plate(s).

Depending on the electrochemical device made, if it does not require the application of a clamping force in the direction of the stack, the clamping plates can be omitted.

It will be understood that the different examples of FIGS. 1 to 6 can be combined. For example the heating means can include one conductor or conductors in one of the clamping plates only and in a spacer plate. Or the heating means include a heating plate 16 and a clamping plate with the heating conductors integrated thereinto.

Preferably, the electrochemical device is disposed in an enclosure so as to reduce energy losses, especially heat losses, and optimise operation of the device. For example, the walls of the enclosure include one or more fibrous insulating materials comprising $SiO_2$, CaO and MgO or one or more light concrete-type materials.

Figure 8:
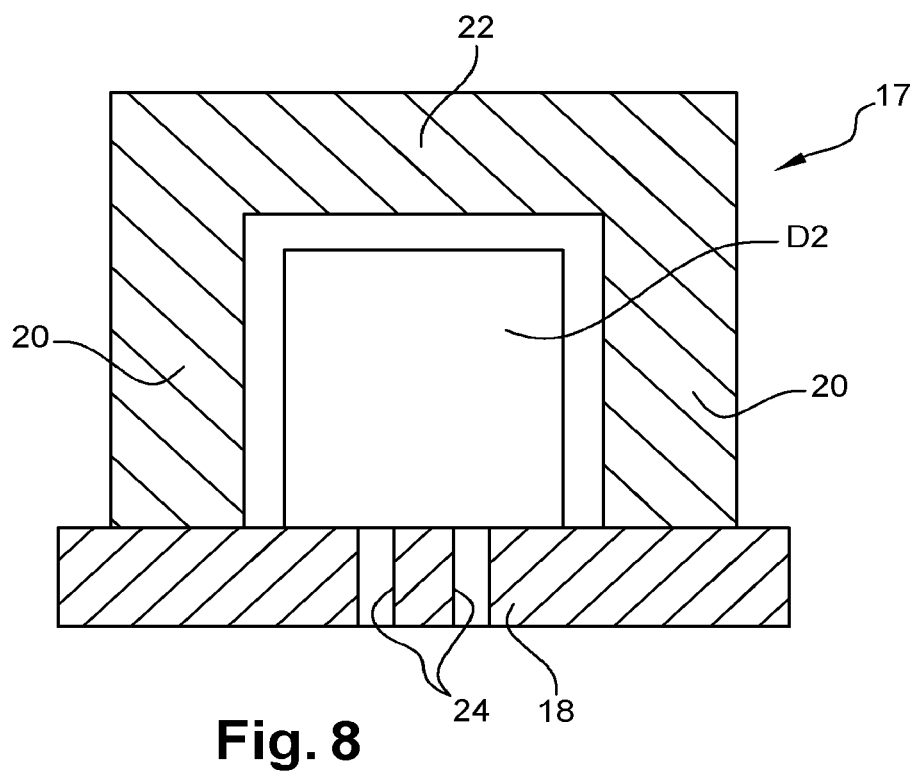
FIG. 8 is a schematic representation of an electrochemical facility implementing a system according to the invention.

In FIG. 8, a schematic representation of a facility can be seen, comprising an electrochemical device according to the invention, for example device D2, disposed in an enclosure 17, the enclosure being represented in a cross-section view.

The enclosure comprises a hearth 18 on which the electrochemical device is disposed, side walls 20 and an upper wall 22. The walls and the hearth define a closed volume thermally insulating the electrochemical device from the external environment.

The enclosure, in particular the side walls 20 and upper wall 22 can be made in one piece or in several parts assembled together. Openings 24 are provided in the enclosure for passing tubes and electrical connectors therethrough. Clearances between perimeters of the openings and the tubes and connectors are advantageously filled with a thermally insulating material. Very advantageously, the fluidic connections and the electrical connections are made through the hearth 18, further reducing thermal leakage.

Preferably the internal perimeter of the enclosure is in accordance with the external shape of the electrochemical device and defines a reduced clearance with the external surface of the device. This allows the inner wall of the enclosure to reflect heat radiated by the electrochemical device towards the said assembly more effectively, and consequently allows the implementation of heating means with reduced power in comparison with those usually used in this type of applications.

Additionally, the combination of integrated electrical heating means and an electrically insulating enclosure also contributes to reducing thermal gradients in the direction of the stack, and to allowing homogenisation of the temperature within the electrochemical device, and thus to improving the efficiency of the latter.

This temperature homogenisation allows a heating set point to be applied to the integrated outer conductors which is close to the desired heating temperature for the stack. This limits the risk of damage to the elements of the device by overheating, especially the elements in the upper part of the stack.

A reflective material on the inner wall of the enclosure could be provided.

Preferably a free space is maintained between the electrochemical device and the inner wall of the enclosure to allow detection of leakage on the stack. In general, the enclosure is flushed with air to dilute and discharge any possible hydrogen leakage from the stack. Further, it is preferable to avoid any contact between the enclosure and the stack to reduce short-circuit risk.

One or more sensors can be carried by the enclosure or disposed in the space between the enclosure and the electrochemical device, it can be a temperature sensor to regulate temperature of the device, a gas sensor to detect leakage in the device.

The electrochemical device according to the invention has the advantage of being very compact because it does not need to be disposed in an oven. Further, it is very easy to use, as it can be easily connected to the four gas supply and collection ducts and to electrical power supplies for the integrated heating system and end plates. The device is then of the "plug and play" type.

In the case where the device is housed in an enclosure, the latter is advantageously small in size as it conforms to the shape of the device which is easily achieved. The enclosure can be assembled around the device, unlike an oven which has electrical resistors on its internal walls. In addition, the walls are of reduced thickness because they do not contain electrical resistors.

The heating means are controlled by a central unit, for example by a computer, for example based on measurements provided by thermocouples, temperature set point(s).

In the case where the heating means are integrated at at least two distinct locations in the stack, the system can have a very large modularity in heating control, indeed it can be contemplated to control them together or separately and thus to modulate heat input according to the location in the stack and/or according to the time of operation, thus allowing a differentiated management of the heating cables.

For example, in the case of a device disposed in a thermally insulating enclosure, heat builds up in the upper part of the enclosure, the upper part of the stack can thereby be maintained to a given temperature with a lesser energy input. It can then be provided to control the heating means to provide a greater heat input to the lower part of the stack.

For example, in a system in which the device includes two clamping plates fitted with heating wire(s) is disposed in an enclosure, driving the heating wires can be as follows:

at the beginning of the operating cycle, heat is generated at both clamping plates until the operating temperature and steady state operation are reached.

Then, during steady state operation, temperature maintenance can be ensured only by heating at one clamping plate, preferably the clamping plate through which the gas supply tubes pass, which are generally at a lower temperature than the operating temperature. The integrated heating means thus also provide a means for heating the gases.

In the case where the gas supply is through the upper plate, heating wires of the upper plate can be operated permanently but only for preheating the gases, the temperature maintenance being ensured by conducting wires of the lower clamping plate.

For example, in the case of operation of the system to produce hydrogen (SOEC), the operation being endothermic, a heat input is provided during the entire operation of the system, the heat input during steady state operation can be provided by the heating means integrated into the lower clamping plate.

In the case of operation of the system for the generation of electric power, for which the operation is exothermic, it can be provided that the heating wires of both clamping plates are supplied with heat to reach the operating temperature, and then permanent heating is provided in the lower clamping plate only for heating the gases.

The invention claimed is:

1. An electrochemical system having at least one electrochemical device comprising:
    a stack of n solid oxide electrochemical cells, n being an integer greater than or equal to 1, and at least n−1 interconnect plates interposed between the electrochemical cells,
    means for supplying gas to the electrochemical cells and means for collecting gases produced by the electrochemical cells,
    means for electrically connecting the system to the exterior,
    heating means using Joule effect, the heating means being inserted into at least one heating plate, and the at least one heating plate being disposed on the stack,
    two clamping plates each disposed at one end of the stack in a direction of the stack, the at least two clamping plates being a distinct element from the stack, and
    tie rods passing through the clamping plates configured to apply a clamping force to the n cells and n−1 interconnects, wherein
    the heating means are disposed so that heating of the stack takes place through at least part of at least one clamping plate, and
    the at least one heating plate is in contact with an external face of the at least one clamping plate, the at least one heating plate being in contact with the external face of said at least one clamping plate and the at least one clamping plate being two distinct elements.

2. The electrochemical system according to claim 1, wherein the n electrochemical cells include a transverse cross-sectional area S taken along a direction perpendicular to the direction of the stack and wherein the heating means define a heating surface area at least equal to the transverse cross-sectional area S of the electrochemical cells.

3. The electrochemical system according to claim 1, wherein the heating means comprise at least one electrical conductor housed in the at least one heating plate.

4. The electrochemical system according to claim 3, wherein the at least one heating plate includes a recess formed in a larger surface area face in which the electrical conductor is housed, the conductor being kept stationary in the recess, or wherein the at least one heating plate includes a machined groove into which the electrical conductor is forced.

5. The electrochemical system according to claim 1, wherein the heating means comprises at least one electrical heating element mounted in a bore of said heating plate.

6. The electrochemical system according to claim 1, wherein the at least one heating plate comprises temperature measuring means.

7. The electrochemical system according to claim 6, wherein the temperature measuring means comprise a sensor configured to measure temperatures of an electrical conductor housed in the heating plate or an electrical heating element mounted in the heating plate, and a sensor configured to measure a temperature of the heating plate.

8. The electrochemical system according to claim 1, comprising a thermally insulating enclosure defining an internal space receiving the electrochemical device and thermally insulating the electrochemical device from the exterior.

9. The electrochemical system according to claim 8, wherein the enclosure comprises a hearth, a side wall and an upper wall and wherein the electrical connection means, gas supply means, and gas collection means pass through the hearth.

10. The electrochemical system according to claim 4, the conductor is kept stationary in the recess by a solder.

11. The electrochemical system according to claim 5, wherein the at least one electrical heating element is mounted in a bore in a side edge of said heating plate.

12. An electrochemical system having at least one electrochemical device comprising:
- a stack of n solid oxide electrochemical cells, n being an integer greater than or equal to 1, and at least n−1 interconnect plates interposed between the electrochemical cells,
- means for supplying gas to the electrochemical cells and means for collecting gases produced by the electrochemical cells,
- means for electrically connecting the system to the exterior,
- heating means using Joule effect,
- two clamping plates each disposed as an outermost plate in the device at one end of the stack in a direction of the stack, each of the two clamping plates being a distinct element from the stack, and
- tie rods passing through the clamping plates configured to apply a clamping force to the n cells and n−1 interconnects, wherein
- the heating means are disposed so that heating of the stack takes place through at least part of at least one clamping plate, and
- the clamping plates include a recess formed in a face of the clamping plates, and
- the heating means comprises an electrical wire disposed in the recess.

13. The electrochemical system according to claim 12, wherein the electrical wire is fixed in the recess using solder.

14. The electrochemical system according to claim 13, wherein the electrical wire is disposed in a bottom of the recess and the solder fills the recess and covers the electrical wire.

15. The electrochemical system according to claim 13, wherein the solder is made of a same material as that of the clamping plate.

16. The electrochemical system according to claim 12, wherein the face is perpendicular to the direction of the stack.

17. An electrochemical system having at least one electrochemical device comprising:
- a stack of n solid oxide electrochemical cells, n being an integer greater than or equal to 1, and at least n−1 interconnect plates interposed between the electrochemical cells and end plates respectively disposed on each end of the stack as an outermost plate of the stack,
- means for supplying gas to the electrochemical cells and means for collecting gases produced by the electrochemical cells,
- means for electrically connecting the system to the exterior,
- heating means using Joule effect,
- two clamping plates each disposed on the stack facing one of the end plates with at least one plate being disposed between one of the end plates and one of the clamping plates, the two clamping plates each being a distinct element from the stack, and
- tie rods passing through the clamping plates configured to apply a clamping force to the n cells and n−1 interconnects, wherein
- the heating means are disposed so that heating of the stack takes place through at least part of at least one clamping plate, and
- the clamping plates include a recess formed in a face of the clamping plates, and
- the heating means comprises an electrical wire disposed in the recess.

* * * * *